July 15, 1958
E. W. ALEXANDER
2,843,117
HERNIA TRUSS
Filed July 6, 1954
2 Sheets-Sheet 1
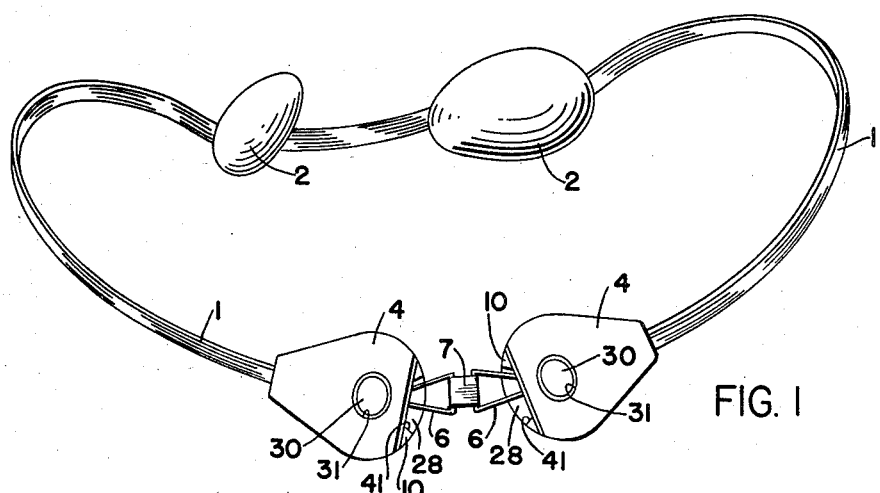
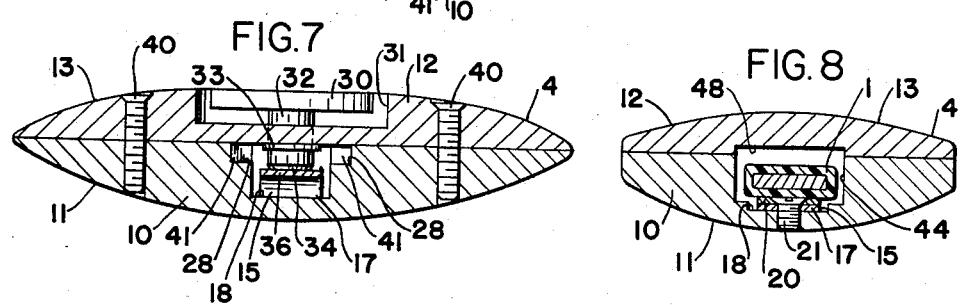
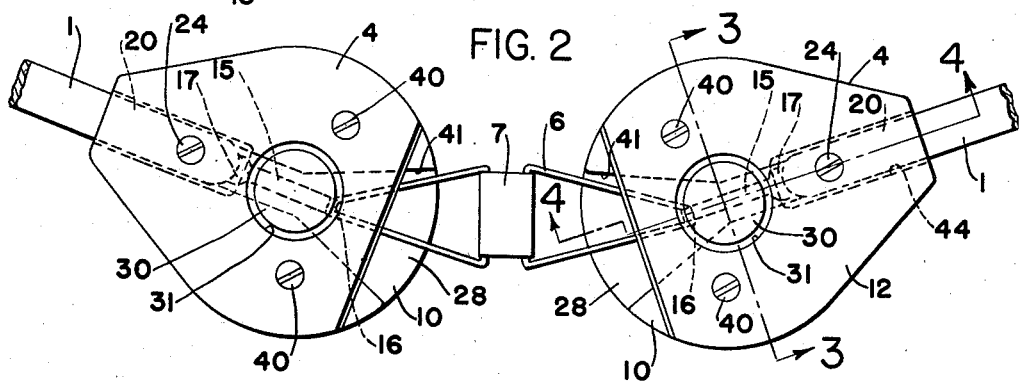
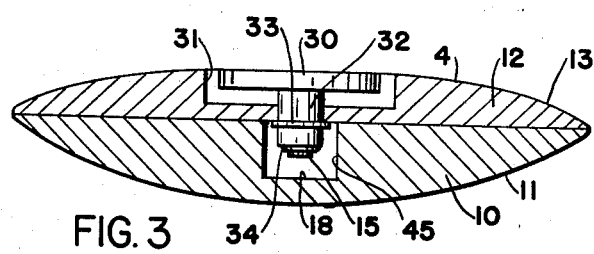
INVENTOR.
EDWIN W. ALEXANDER
BY
ATTORNEY July 15, 1958  E. W. ALEXANDER  2,843,117
HERNIA TRUSS Filed July 6, 1954  2 Sheets-Sheet 2

INVENTOR.
EDWIN W. ALEXANDER
BY
ATTORNEY

United States Patent Office 2,843,117
Patented July 15, 1958

2,843,117

HERNIA TRUSS

Edwin W. Alexander, Silver Lake, Ohio, assignor to Akron Truss Company, Inc., Cuyahoga, Ohio, a corporation of Ohio Application July 6, 1954, Serial No. 441,442

4 Claims. (Cl. 128—99)

This invention relates to a ring-like truss such as is worn for the relief of hernia or the like. More particularly, it relates to fastening means for joining the ends of such a truss.

The fastening means is preferably composed of a latch and latch-engaging means which join the two ends of the truss. It is constructed in such a manner that mere pressure accidentally applied will not unlatch the latch and thus disconnect the two ends of the truss. A relative movement of the latch and latch-engaging means in two different directions is necessary in order to disengage the two parts. In the preferred embodiment of the invention, in order to move the latch out of engagement with the latch-engaging means, it is first necessary to increase the overlap of the two. It is then possible, by applying pressure to a button, to move the two parts out of engagement with one another. The reverse procedure is followed in engaging the two parts of the fastening means.

The invention will be further described in connection with the accompanying drawings, in which—

Fig. 1 shows a view in perspective of the ring-like truss employing two of the fastening means of this invention to serve as the back pads of the truss.

Fig. 2 is an enlargement of a detail of the same, showing the fastening means in which the two ends of the hernia truss are engaged with one another;

Fig. 3 is a section through the fastening means on the line 3—3 of Fig. 2;

Figure 6:
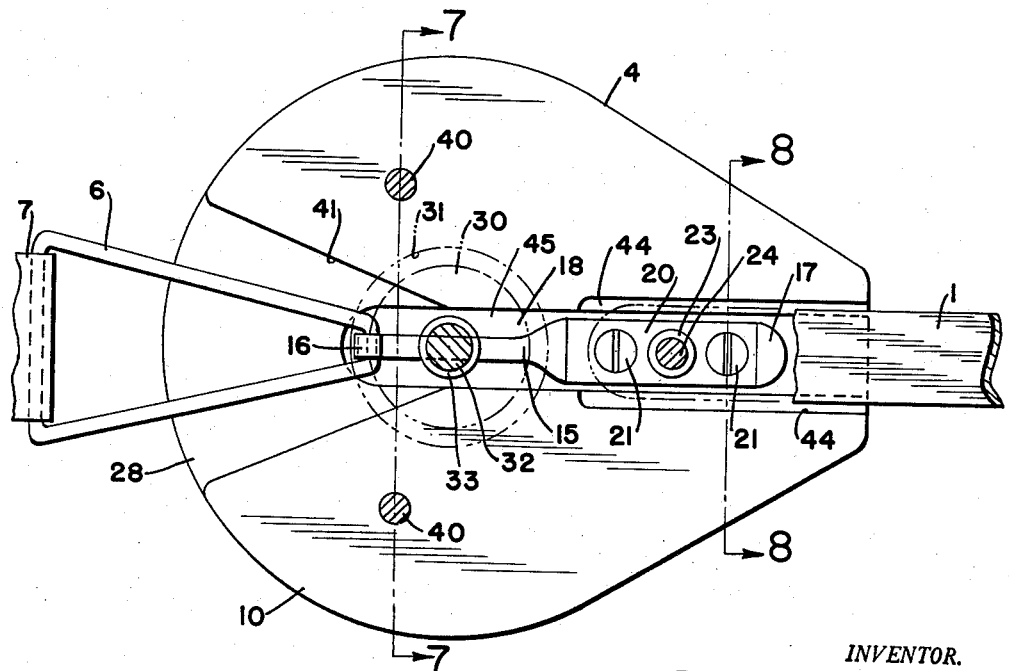
Fig. 6 is a view of the fastening means on the line 6—6 of Fig. 4.

Figs. 7 and 8 are sections on the lines 7—7 and 8—8, respectively, of Fig. 6.

The ring-like truss includes the continuous plastic ring 1 with the two truss pads 2 suitably fastened thereto. The fastening means 4 attached to the two ends of the plastic ring replace the usual plastic back pads. The wire loops 6 which are engaged by the fastening means are united by the short leather strap 7. It is not necessary to employ two of the novel fastening means as one may be used in conjunction with a back pad of the usual type.

Each fastening means 4 is made of two parts. Both parts may be of metal, plastic, or any suitable material. The fastening means is flat and not bulky so as to fit close to the body of the wearer and not be discernible when covered with clothing. One part of the fastening means, referred to herein as the first part 10 has a smooth, gently curved outer surface 11 which contacts the body of the person wearing the truss. The other part referred to as the second part 12 has a smooth outer surface 13 which is covered by the clothing of the wearer.

Both fastening means are of the same construction, and this will be described in detail with reference to the device shown at the right in Fig. 2. The first part of the device is hollowed out at the inner end to receive one end of the ring 1, at the outer end to receive the loop 6, and in the middle to provide for vertical movement of the spring latch 15. The outer end of this latch is bent back at 16 to provide a hook for engagement with the loop 6. Its inner end 17 is flat and rests on the bottom surface 18 of the hollowed out center of the first part. The inner end of the hook is held in place by the bracket 20 which is fastened to the first member 10 by the two bolts 21. Midway of the length of the bracket is an internally threaded boss 23 into which the bolt 24 is screwed to hold the two parts 10 and 12 of the fastening element together. Fig. 6 shows that the inner end 17 of the spring is wider than the outer end which engages the hook.

The upper part of the outer end of the first part 10 is cut out in a V-shape to form the surface 28 on which the loop 6 is supported. The shape of the cut-away portion is such that the loop can pivot about its point of attachment to the hook, to provide flexibility to the entire ring-like truss.

The second part 12 of the fastening means supports the push button 30 in the depression 31. The projection 32 on the under side of the button 30 projects through the second part 12 and the lock washer 33 holds the push button in place. The end 34 of the projection contacts the latch 15 at a point 36 (Fig. 4) which is spaced away from the surface 18 of the first part 10.

When the truss is being worn the first part 10 of each fastening device is against the body of the wearer and the part 12 is exposed. This exposes the push button 30. In order to engage the two ends of the truss, with one loop 6 engaged with one of the fasteners, it is merely necessary to press the other loop 6 into the other fastener along the surface 28. The forward surface of the loop contacts the bent-back hook 16 of the latch and depresses it. The loop is pushed into the fastener beyond this head; and the latch then snaps back into place. The inward pressure on the loop is then released, and the loop is engaged by the latch.

Figure 4:
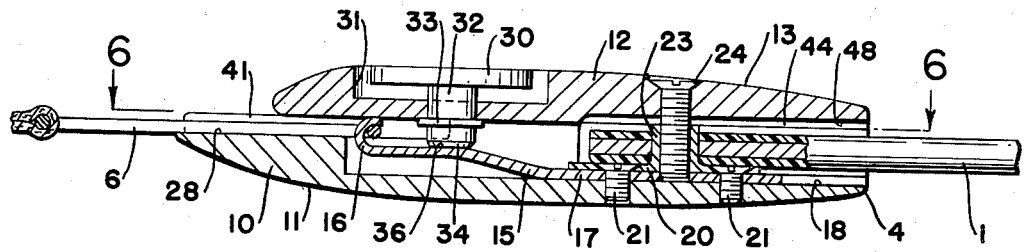
Fig. 4 is a section through the fastening means on the line 4—4 of Fig. 2.
Figure 5:
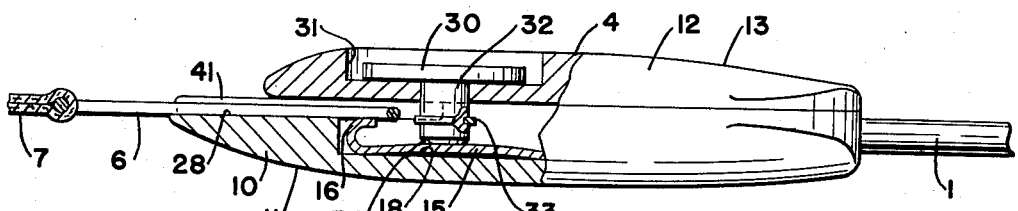
Fig. 5 is a side view of the fastening means partly broken away to show the button depressed and the two ends of the truss disengaged.

In order to remove the truss, it is necessary to disengage the latch in one of the fasteners from the loop with which it is engaged. To do this the procedure is reversed. Starting with the arrangement shown in Fig. 4, the two ends of the truss are moved toward one another to increase the overlap so that the hook 16 is laterally displaced from the loop. Then, on depressing the push button 30, the latch is vertically disengaged from the loop as illustrated in Fig. 5.

In addition to being held together by the bolt 24, the two parts 10 and 12 of the fastening element are held together by the two bolts 40. The surface 28 at the outer end of the part 10 extends inwardly to the axis of the push button, along the wall 41 as illustrated in Figs. 4, 5, and 6. As illustrated in these figures, this wall extends backwardly to the axis of the push button. From the axis of the push button to the inner end of the fastening element the upper surface of the first part is flush with the under surface of the second part 12 except for the hollowed out central portion 44 (Figs. 3, 6, and 8) in which the bracket is located and the central hollowed out portion 45 in which the latch is located. The under surface of the second part 12 is hollowed out at its inner end to form the top surface 48 (Figs. 4 and 8) to cooperate with the opening 44 in accommodating the end of the truss.

It is to be understood that changes may be made from the illustrated structure. For instance, instead of being made of spring metal, the latch may be operated by separate spring means. The push button may operate laterally instead of vertically. The fastening means need not be made in two parts. The invention is defined in the appended claims.

What I claim is:

1. In a ring-like truss composed of a ring adapted to encircle the body of a wearer of the truss, and at least one hernia pad thereon, with fastening means for releasably uniting the ends of the ring, which fastening means includes a latch at one end of the ring and latch-engaging means at the other end of the ring, the improvement which includes the location of said latch within an enclosure having an opening therein for insertion of the latch-engaging means for engagement with the latch when the latch and latch-engaging means overlap within the enclosure, said latch and latch-engaging means when engaged being disengageable only by both increasing the amount of said overlap and moving the latch out of alignment with the latch-engaging means.

2. The truss of claim 1 in which pressure of the latch inwardly of the ring disengages the latch, and the latch is provided with a hook engageable with the latch-engageable means and disengageable therefrom by said pressure only after the hook has first been moved in the direction to increase the overlap between it and the latch-engaging means.

3. The truss of claim 1 in which the enclosure is formed of two mating elements, the latch is attached to the first of said elements at one end of the ring, a push button is in the second element at said first end of the ring, and the latch-engaging means is at the other end of the ring; the first element being gently curved with a smooth outer surface, the spring latch being formed of spring material with its inner end fastened to the inner surface of the first element and its outer end raised therefrom with its top bent backwardly on itself to form a hook.

4. A ring-like truss which includes a ring adapted to encircle the body of the wearer of the truss, and at least one hernia pad on the ring, with fastening means for releasably fastening the ends of the ring, which means includes a loop at one end of the ring and a hook engageable therewith which hook is in a thin, relatively flat housing at the other end thereof, said housing being formed of two parts fastened together with the inner surface of the first part adapted to fit substantially flush against the body of the wearer of the truss and the outer surface of the second part being gently curved so as to be inconspicuous under the clothing of the wearer, the hook being of spring metal with its inner end fastened to said first part between the two parts, the outer end of the hook being raised from said first part and turned back over itself, the outer end of said first part being raised to support the loop for engagement with the hook and disengagement therefrom, a push button in said second part with its push surface not projecting above said outer surface of said second part, and a projection directed inwardly from the button for contact with a portion of the hook which is raised from said first part so that pressure thereon pushes said raised portion of the hook toward said outer surface for disengagement of the hook from the loop, whereby to disengage the hook and loop it is necessary to increase the overlap of the hook and the loop and then to apply pressure to the push button in order to move the hook out of lateral alignment with the loop.

References Cited in the file of this patent

UNITED STATES PATENTS

| 517,639 | Brickner et al. | Apr. 3, 1894 |
| 1,918,590 | Burton | July 18, 1933 |
| 2,479,150 | Boraski | Aug. 16, 1949 |

FOREIGN PATENTS

| 4,118 | Switzerland | Oct. 20, 1891 |